United States Patent
Wiggins et al.

(10) Patent No.: US 7,765,542 B2
(45) Date of Patent: Jul. 27, 2010

(54) METHOD AND SYSTEM FOR DESCRIBING AND EXTRACTING APPLICATION INFORMATION

(75) Inventors: Greg Wiggins, Pleasant Grove, UT (US); Rajesh Moorjani, Pune (IN); Vivek Kumar Rai, Gwalior (IN); Vivek Umesh Bhagwat, Pune (IN); Sanjay Ahuja, Nagpur (IN); Santosh D. Surve, Pune (IN)

(73) Assignee: Symantec Corporation, Mountain View, CA (US)

( * ) Notice: Subject to any disclaimer, the term of this patent is extended or adjusted under 35 U.S.C. 154(b) by 460 days.

(21) Appl. No.: 09/768,482

(22) Filed: Jan. 23, 2001

(65) Prior Publication Data
US 2002/0010808 A1    Jan. 24, 2002

Related U.S. Application Data

(60) Provisional application No. 60/177,585, filed on Jan. 23, 2000.

(51) Int. Cl.
*G06F 9/445* (2006.01)
(52) U.S. Cl. .................. 717/177; 717/175
(58) Field of Classification Search ......... 717/171–178, 717/121–123, 106–113
See application file for complete search history.

(56) References Cited

U.S. PATENT DOCUMENTS 5,347,653 A * 9/1994 Flynn et al. ............. 707/203
6,212,532 B1 * 4/2001 Johnson et al. ............ 715/500

OTHER PUBLICATIONS

Kahani, 'WWWCopy™ Version 1.1', , http://www.geocities.com/SiliconValley/Bay/5543/wwwcopy.html, pp. 1-7, 1997.*
Microsoft Window 98, "Year 2000 Update README file", http://www.cc.jyu.fi/~kky/atk/windows/y2k/w98eng/y2k.txt, pp. 1-6, 1998.*
Inside the Internet, "Create self-extracting ZIP files with WinZip 6.3" ProQuest Computing, pp. 12-14, May 2000.*
Nico Mak Computing, "WinZip(R)—Version 7.0", Nico Mark Computing, Inc., http://www.kanisiusmedia.com/download/WINZIP/WHATSNEW.TXT, pp. 1-2, 1998.*
Network Associates, "Total Virus Defense Suite—Best Practices Guide—Migration Technical Manual", Network Associates, Inc., Version 4.x family products, pp. i-x, 1-248, May 1999.*
Lundh, "The Console Module", http://effbot.org/downloads/index.cgi/console-1.1a1-20011229.zip/module-console.html, pp. 1-6, Feb. 2000.*
O'Connell, "Go inside WinZip 7.0", Nov. 1998, retrieved from http://goinside.com/98/11/winzip.html, pp. 1-7.*
Andre Merwe "Creating a Compressed, Self-Extracting Installation File", Mar. 1998, Pinnacle Delphi Developer, pp. 1-14.*

* cited by examiner

*Primary Examiner*—Ted T Vo
(74) *Attorney, Agent, or Firm*—Advantedge Law Group (57) ABSTRACT

A method and system for describing, extracting and migrating application information from a first personal computer to one or more other computers. This method and system provides a means for selecting and translating the information useful in transferring application programs, settings and files while maintaining the preferred preferences and directories of the users. Using a standard INI file format, this method makes use of Application Information Files (AIFs) containing tags. The tags provide identification of multiple versions of the application and conversion information for settings, registry information and files.

17 Claims, 9 Drawing Sheets

METHOD AND SYSTEM FOR DESCRIBING AND EXTRACTING APPLICATION INFORMATION

CROSS FERERENCE TO RELATED APPLICATIONS

This application is based on Provisional Application Ser. No. 60/177,585, which was filed on Jan. 23, 2000, which is hereby incorporated by reference herein in its entirety, and priority is claimed thereto.

BACKGROUND OF INVENTION

1. Field of the Invention

This invention relates to methods and systems for migrating software and/or software components from one computer system to another. More specifically, this invention relates to the transfer of computer application program settings and data files using one or more Application Information Files (AIF).

2. Description of Related Art

A variety of techniques are well known in the art for transferring files and application programs from one computer system to another. Most common techniques include manually loading the files and programs via electromagnetic media, such as computer disks, tape, and memory cartridges, or manually transferring the files and programs over a computer network. Such methods are generally time consuming and require that the application's specific settings be reset on each new computer installation. It is also known to use scripting files to describe and process application settings and files to help with the migration of applications from one personal computer (PC) to another. However, such techniques generally require that the user have extensive programming experience and knowledge in order to create a description of what and how to migrate an application.

SUMMARY OF INVENTION

It is desirable to provide a method and system which aids in the migration of computer files, including applications and data files, from one Personal Computer (PC) to one or more other PCs, without the requiring the user to manually move an application, its settings or files, where such are described in an Application Information File (AIF).

Furthermore, it is desirable to provide a method and system for describing and translating the information in an AIF format, which provides a collection of tags that describe a computer application, its version, conversion settings, registry information and files.

Therefore, it is the general object of this invention to provide a method and system for describing and translating the information in an AIF to simplify the migration of information from one PC to one or more other PCs.

It is a further object of this invention to provide a method and system for describing and translating computer program files and information, which uses a familiar INI, file format.

It is another object of this invention to provide a method and system for describing and translating computer program files as well as information which provides a simplified "tag=value" format.

A further object of this invention is to provide a method and system for describing and translating computer program files and information that eases the creation and modification of program translation files.

A still further object of this invention is to provide a method and system for describing and translating computer program files and information that permits the use of tools to automate the creation and modification of AIFs.

Another object of this invention is to provide a method and system for describing and translating computer program files and information wherein pre-existing robust Application Program Interfaces (APIs) can be used for writing data to an AIF using an INI file format.

These and other objects and advantages of this invention are achieved by the invention as described herein.

BRIEF DESCRIPTION OF DRAWINGS

The accompanying drawings incorporated in and forming a part of the specification illustrate a preferred embodiment of this present invention. Some, although not all, alternative embodiments are described in the following description. In the drawings.

Reference will now be made in detail to the present preferred embodiment of the invention, an example of which is illustrated in the accompanying drawings.

DETAILED DESCRIPTION

This invention is a method and system, which provides an improved means for migrating applications, settings and data files between computer systems. It makes use of the Application Interface File (AIF) and describes, extracts and translates the information in an AIF to simplify the migration of information from one personal computer (PC) to another PC.

An application program can be described by use of a defined set of tags. These tags can identify multiple versions of an application, how to convert settings across application versions, registry information, and files. A collection of these tags, grouped together into a file is known as an "Application Information File"(AIF). Using an AIF, this invention takes the described data and migrates an application along with its settings and data files to another computer.

Preferably, the AIF of this invention uses INI file syntax with the following exception: duplicate value names are allowed within a section. INI file definitions are broken down into three parts: section name, value name, and value. An example of a typical INI definition may look like the following:

[My Section]
MyFirstValueName=Value
MySecondValueName=Value
[Another Section]
MyFirstvalueName=Value
MySecondValueName=Value
MyThirdvalueName=Value
...

All AIFs start with a section called Applications. Under that section a value name of EXE must exist. Its value is the name of the application's .exe file. For example:

[Applications]
EXE=Express.exe

The EXE value listed must match the .exe filename listed under the registry key. for example:

HKEY_LOCAL_MACHINE\Software\Microsoft\Windows\CurrentVersion\App Paths

For use with MICROSOFT operating systems, MICROSOFT requires that all applications installed under WINDOWS add the name of the application's executable to this registry key and include a default value of the full path to the executable. If this invention (the Wizard component) cannot find the executable listed in the AIF with the path defined in the registry, the application will not be displayed under the application's tab. Another limitation of the AIF may occur during installation of the application. If the application settings and data files stored in a Personality Package do not match the version of the application on the destination PC, the registry settings and files may not be installed in the correct location or in the correct format for that version.

After the Applications section of the AIF is a Version section providing information for each Version of the application. All versions of an application may be supported within the same AIF. Each Version section must provide a Description value name followed by a description of the application. For example:

[4.0]
Description=Altiris Express 4.0
...
[4.1]
Description=Altiris Express 4.1
...

Using a version number of 0, allows a user to create default information about the application. For example:

[0]
Description=Altiris Express

The remaining value names listed under the Version section follow the order Option, Flag, Base, and Values. These items can be repeated for each registry and file item to be associated with the application's version.

The Option value can be one of two values TRUE or FALSE. The Option value lets the Wizard section of the invention know that the information that follows is optional. If the item is optional and the Wizard section is unable to collect the data, the setting will not be aborted.

The Flag value can be one of four types: Registry, File, FileType, and API. The Registry Flag type is used to describe registry keys and values. The File Flag type is used to describe directories and files. The FileType is for a specific document type. FileType is used if the user wants to include a specific file or type of file, and yet the user does not know where it is located. Since FileType does not need a path, the Base value name is ignored. The API flag is used only internally.

The Base value is used to describe the path to an item. The value provided for Base must correspond to the Flag type that is defined. For example, if a Flag value is Registry type, a Registry path must be specified. For a Flag of File type a directory path must be used. A path may include system environment variables, a program variable, or the contents of a registry value. Examples of system variables are: %windir%, %systemdir%, or %temp%. Program variables include: %MI_DESKTOP%, %MI_STARTMENU%, %MI_SENDTO%, %MI_FAVORITES%, %MI_WINSYSTEMDIR%, %MI_APPDATA%. To get the path from a registry value the syntax <%Reg:registry path%> is used.

The Values type is the specific item using the Base path. Wildcards may be used when specifying Values. Multiple values may also be specified by separating each value with a comma. For example: Values=file1.txt,file2.txt,file3.doc.

The following are the examples showing the use of the Flag, Base, and Values:

[4.0]
Description=Altiris Express 4.0
Flag=Registry
Base=HKEY_CURRENT_USER\Software\Altiris\Altiris Express
Value=*.*
Flag=File
Base=%windir%
Value=express.ini
Flag=File
Base=<%REG: HKEY_CURRENT_USER\Software\Altiris\Altiris Express\directory%>
Value=*.img
...

Sub-items may be created for an application by creating a section name starting with the Version number, plus the name of the sub-item. Each sub-item may also use the Flag, Base, and Values definition. For example:

[4.0 Rapidinstall Packaged]
Flag=File
Base=<%REG: HKEY_CURRENT_USER\Software\Altiris\Altiris Express\directory%>\rips
Value=*.exe For a sub-item to exist for all versions of the application the number "0"can be used as the version number before the name of the sub-item, for example: [0 Data Files].

Figure 1:
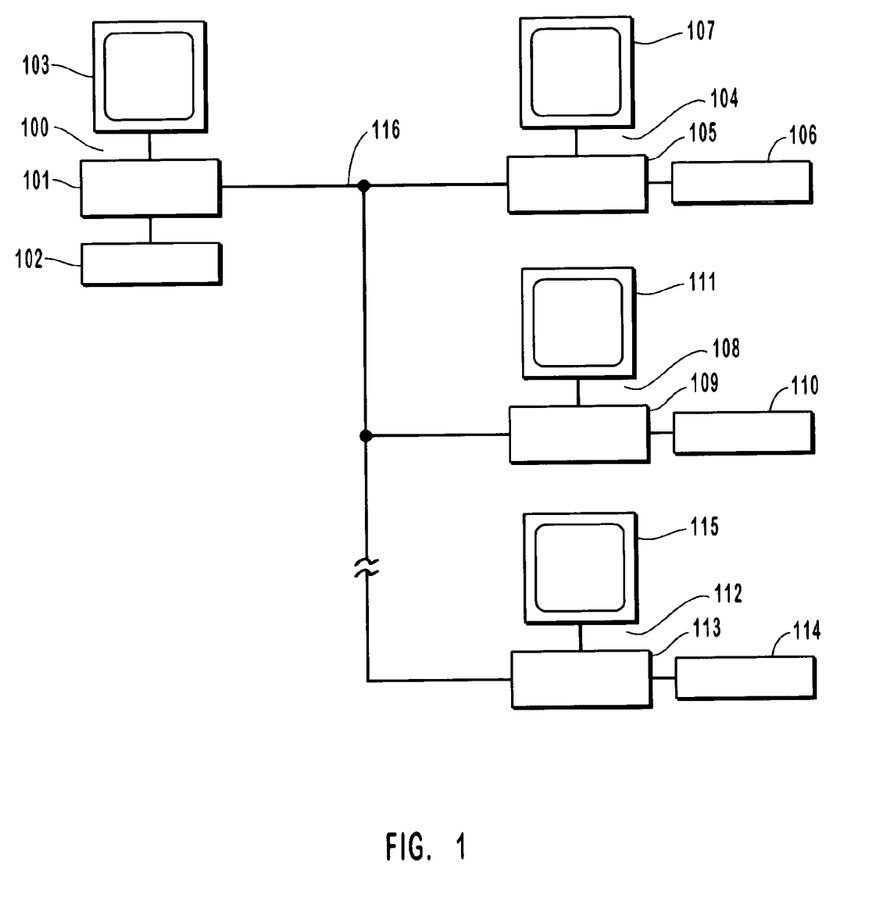
FIG. 1 is a top-level system block diagram of the PC computer systems used in the preferred embodiment of this invention.

Referring now to the figures and in particular to FIG. 1. In the preferred embodiment of this invention a first computer system 100, which has a processing unit 101, with a processor, memory and a long term storage device, connected to an input device 102 and a display device is in communication 116 with one or more other destination computer systems 104, 108, 112. Each destination computer system also has a processing unit 105, 109, 113, with a processor, memory and a long term storage device, connected to an input device 106, 110, 114 and a display device 107, 111, 115. The communication channel 116 between the first computer system 100 and the other computer systems 104, 108, 112 is preferably a local area network, although alternative communication channels, including but not limited to a wide area network, a wireless network, the Internet or the like may be substituted without departing from the concept of this invention. The preferred computer systems 100, 104, 108, 112 are typically personal computers (PCs) although other computational devices can be substituted without departing from the concept of this invention. For the purposes of this disclosure, PC shall be interpreted to mean any computational device.

Figure 2:
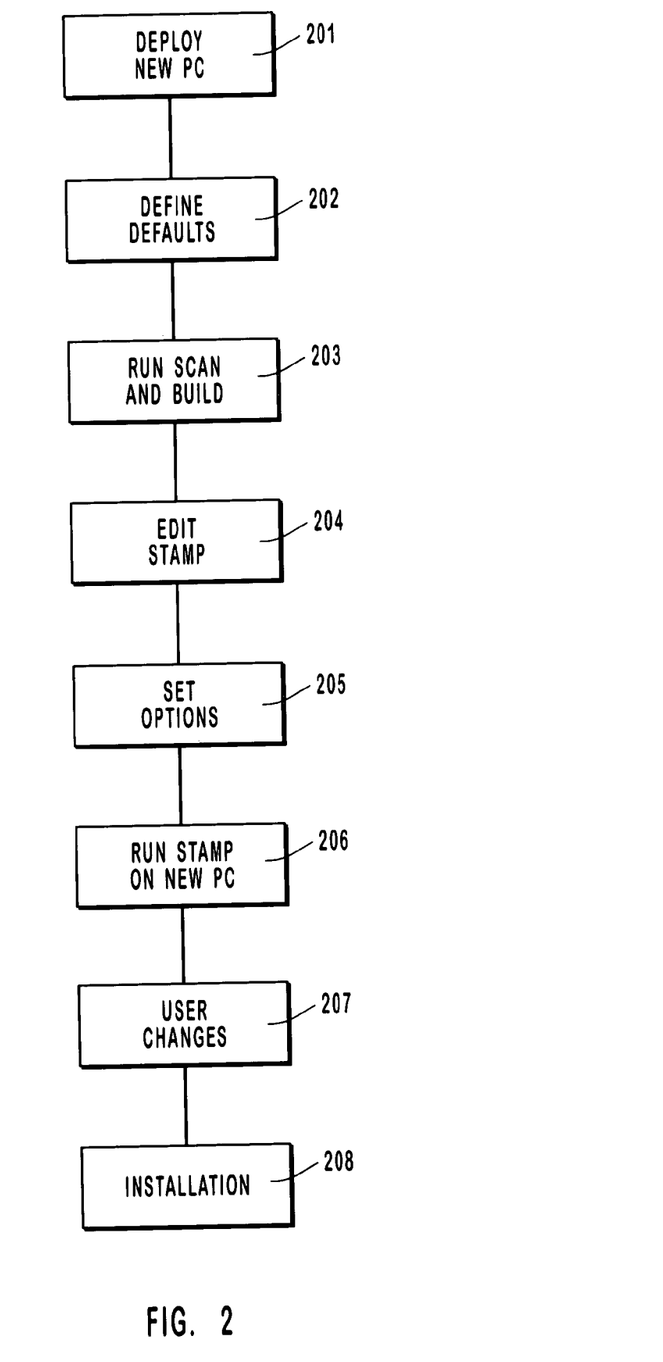
FIG. 2 is a top-level flow chart showing the preferred method steps of this invention.

FIG. 2 shows the top-level steps of the preferred process of this invention. In general in its preferred embodiment, this invention consists of two key modules, the Console and the Self-exTracting Auto-Migrate Packages (STAMPs). The Console is run on the Source PC (the Source PC is the PC the user is migrating from). This executable program scans the drive(s) for the environment settings and files to be migrated and builds the STAMPs. The Console includes scan options for optimizing the disk scans and a filter for determining which settings and file types are included in the package for transfer. The Console also includes an edit function, which allows the user to add or delete files and settings from the STAMP before delivery to the Target PC (the Target PC, also referred to as the destination PC, is the PC the user is migrating to).

The STAMPs are self-executing files that contain all of the files and settings to be migrated to the Target PC. These files contain all of the intelligence needed to write files to the appropriate destination and to make the appropriate registry changes. The STAMPs also allow the technician running the process on the Target PC to further filter the files and settings to be installed.

The preferred migration process of the invention begins with deploying 201 the new, or target PC. This step of the process assumes that the new PC has been installed with an operating system and applications and is configured for network connectivity. This step is preferably accomplished using a PC cloning product such as RAPIDDEPLOY.

Defaults are defined 202. This step establishes the file and setting defaults and includes which file extensions to extract and which directories to include and the like.

Scan and Build is run 203. This step involves scanning the source PC and extracting from the source PC the files and settings. The STAMP file is also created during this step and is saved to a location accessible by the target PC. Typically and preferably the target PC is a file server. STAMP is then edited 204 by adding or removing files or registry settings. The resulting edited STAMP defines what will be transferred to the target (or new) PC.

Options can be set 205 or adjusted at this point in the process. These options can include: unattended install, custom bitmap to use as a splash screen, STAMP description and instructions, and run STAMP password protection.

STAMP is next run 206 on the new (or target) PC. This program can be executed either from the target PC or through some management or scheduling application, such as MICROSOFT SMS or ALTIRIS RAPIDX.

User changes 207 permit the user to view the contents of the STAMP and to exclude any files or settings from being installed, if the user breaks in.

Installation 208 is the final step of the process where the files and registry settings are installed to the target PC.

The reader should note that while this invention is designed generally to extract operating system settings, applications, settings and files, the present embodiment provides automatic migration capabilities for the following types of settings, applications and files.

Currently supported settings include: accessibility, active desktop, colors, desktop icons, display properties, explorer settings, favorites, icon metrics, keyboard, mouse, pattern, power, printers, regional information screen, saver, send-to menu, shell, sound, start menu, task bar, wallpaper and window metrics. Currently supported applications include: Suite MICROSOFT OFFICE 97 SUITE, MICROSOFT INTERNET EXPLORER, MICROSOFT OUTLOOK and NETSCAPE.

Currently supported data files extractions include: (1) Automatic extraction, where files are automatically extracted based on file extension, full file name or directory location. Entire directories, or subdirectories, such as "MyFiles" may also be extracted automatically. (2) Pre-defined application types, which includes a library of file extensions for common software applications. The user has the option of including or excluding any known extension type. (3) Pre-defined folder types, which include a library of directory/folder names for common data directories (i.e., "MyFiles"). The user has the option of including or excluding any of these known directory types. (4) Other applications and folders are allowed by adding any user-defined file extension and include an option to use a wildcard for scanning and gathering files with any extensions. (5) Manual extraction capabilities provide the user with the ability to edit a STAMP by adding files, folders and registry settings manually to the package after the STAMP is created.

The preferred embodiment of this invention includes a number of features to enhance the efficiency of the process of this invention, including: (1) Package compression depending on gathered file types, compression ranges from 30 to 70 percent. (2) Cross-platform migration in the present embodiment, this process automatically converts operating system and connectivity settings between WINDOWS 95, WINDOWS 98, and NT 4. This allows users to migrate operating systems at the same time they migrate their PC and still maintain all user preferences and settings. (3) Drive exclusion provides the option of excluding any of the physical or logical drives on the source PC in the scan step. (4) Folder exclusion provides the option of excluding any folder/directory on any of the source PC drives in the scan step. (5) Self-extracting files provides self-extracting and fully self-contained STAMPs. No client agent is required to run the STAMP on the target PC. (6) Selectable file destination provides that STAMPs can be directed to any known storage device with a drive mapping, including hard disk drives, floppy disk drives, network server drives, JAZZ, ZIP, or CD ROM drives. (7) Disk space verification provides a check for available disk space on the target PC. This check is based on the extracted size, not the compressed package size. If there is not sufficient space for extraction, the program of this invention returns an error message. (8) Password protection provides password protection for STAMPs. Passwords may be defined as the STAMP is created or any time thereafter. The STAMP will prompt the user for the password prior to execution on the target PC. (9) Migration package description provides the capability of optionally including a description of up to 256 characters. This description will be displayed when the package (program) is executed. This text may describe the contents of the STAMP or provide instructions to the user/technician STAMPing the new PC. The user running the package process of this invention may choose at this point to continue or abort the migration. (10) Duplicate file options provides options for handling duplicate files, such as overwrite older, overwrite newer, always overwrite. These options are defined by the STAMP creator at the time the package is created. (11) Unattended migration provides the capability for supporting "quiet" or unattended installations. Command-line switches enable the STAMP to be run remotely through a scheduler or desktop management product without requiring a user to be present. (12) User-defined profiles permits the user to create and store profiles that will define which applications, folders, and files will be included in a STAMP. A dialog box within the Console module walks the user through the process of building the migration profile. This dialog box also allows the user to see which Profiles are already available and to enable the user to edit existing profiles. (13) Command-line mode provides the user with the ability to run STAMP from a command line or from a WINDOWS "Run" command. This also enables the STAMPs to be run from within a scheduling or desktop administration application. Command line switches are available for (a) running in quiet mode (without user intervention); (b) calling a user-defined profile to use; and (c) defining a location to save the STAMP file. (14) Edit STAMP provides, through the Console module, the user capability of editing STAMPs, including adding and deleting files and making changes to the registry settings within the STAMP. This function allows users to further customize the migration. And (15) Log file with summary report provides a log file to track all changes made to the target PC and provides a report of what was not completed. Errors are also reported here.

Figure 3:
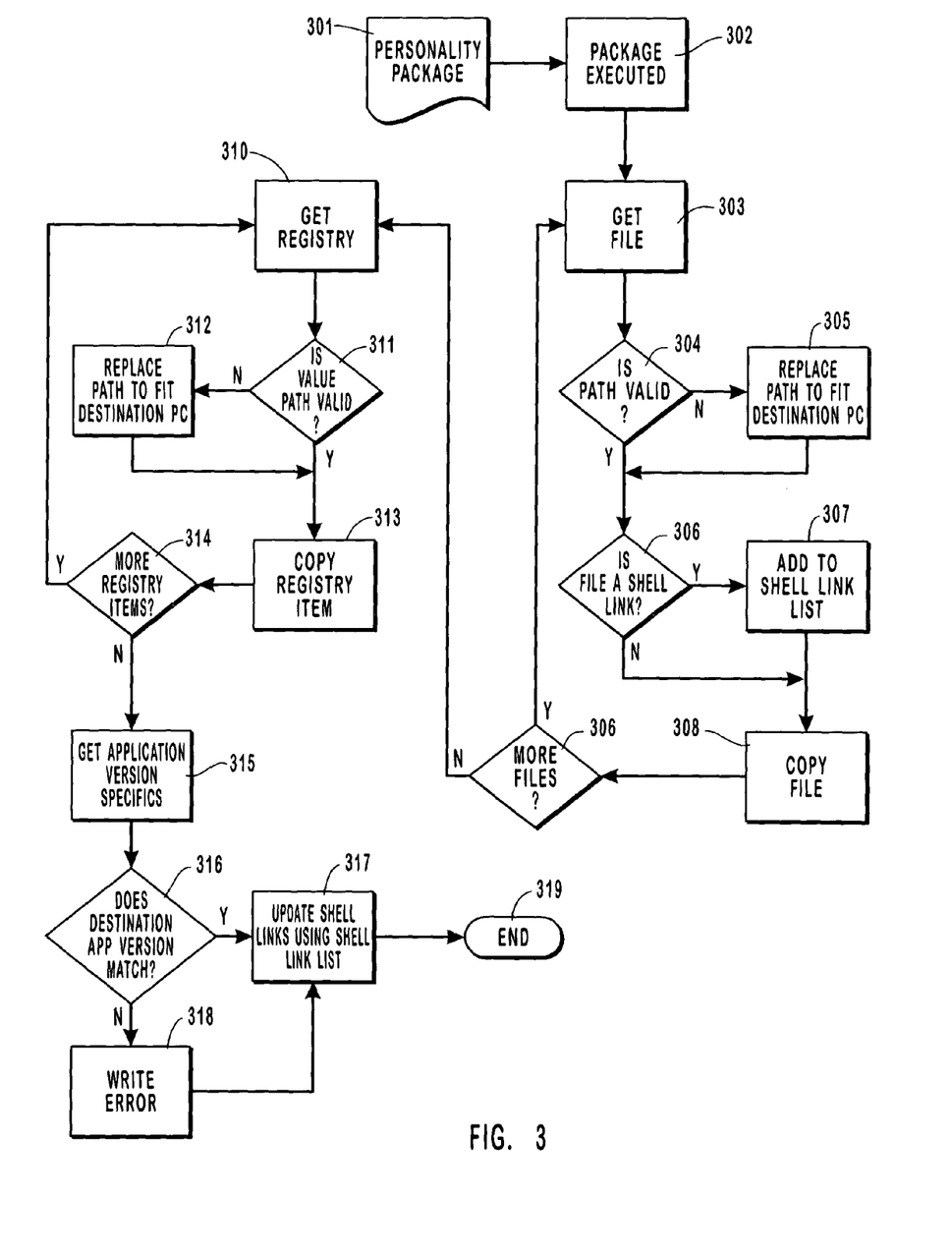
FIG. 3 is a process flow chart showing the method steps whereby application data is transferred from an Installed file to a PC in the preferred embodiment of the invention.

FIG. 3 shows the detailed flow chart of the preferred process flow showing application data being transferred from an Install file to a PC. First, a Personality Package 301, containing the desired settings, preferences, applications and files, is loaded. The Package is executed 302 in the source PC processor. A desired file is retrieved 303. A valid path test 304 is made. If the path is not valid, the path is replaced 305 to fit the destination PC. Next, at test 306 is made to determine if the file is a shell link. If the file is a shell link, it is added 307 to the shell link list. Next, the file is copied 308. A test 309 is made to determine whether there are more files to migrate. If there are more files to migrate the process returns to step 303, getting a file. Otherwise, the Registry is retrieved 310. A test 311 next is made to determine if the Value path is valid. If the Value path is not valid the path is replaced 312 to fit the destination or target PC. Next, the Registry Item is copied 313. A test 314 is made to determine if there are more Registry Items. If more Registry Items remain, the process returns to the Get Registry step 310. Otherwise, the application version specifics are retrieved 315. A test 316 is then made to determine if the destination or target application versions match. If they do not match, an error is written 318. Next, the shell links are updated 317 using the shell link list. Then the migration process ends 319.

Figure 4:
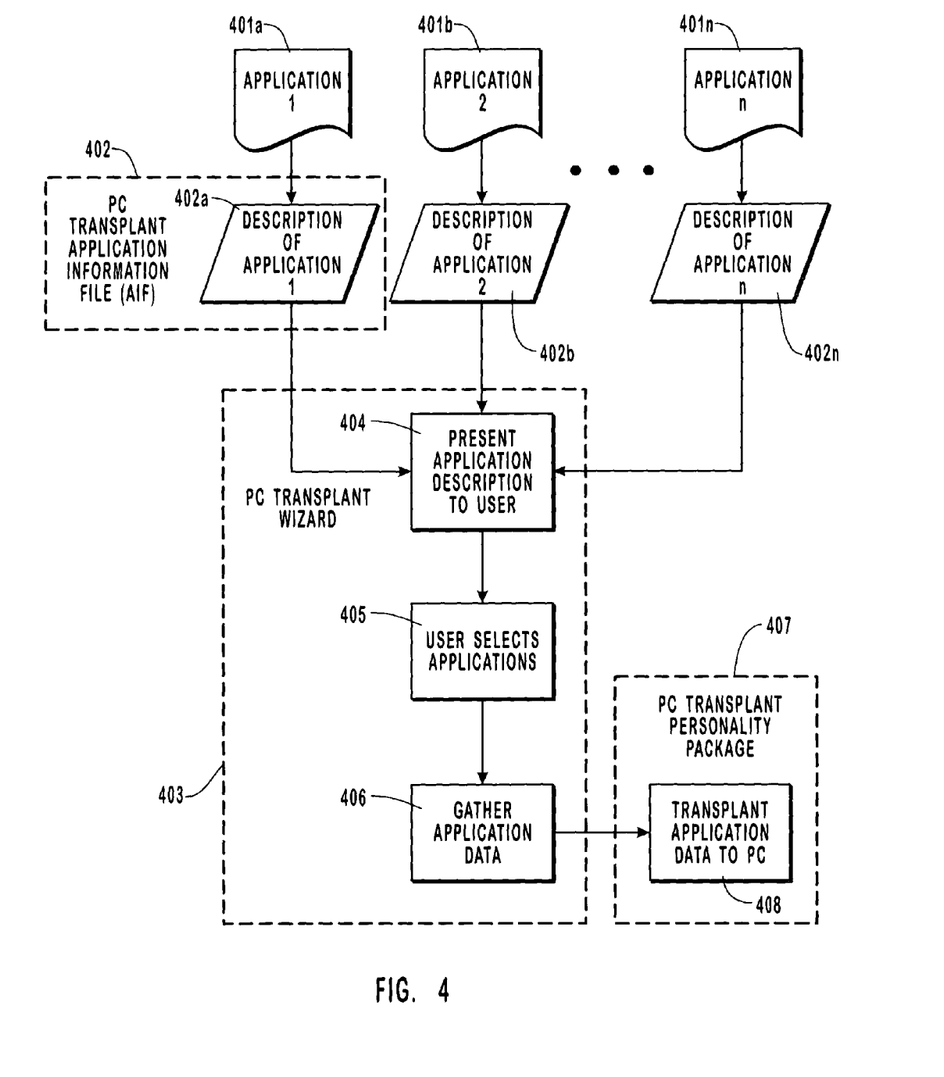
FIG. 4 is a process flow chart showing the preferred method steps of the transplant process of this invention.

FIG. 4 is a process flow chart showing the preferred method steps of the transplant process of this invention. A number of applications programs 401a-n are provided to the system of this invention. These application programs 401a-n in the present preferred embodiment can be any WINDOWS based computer application program, such as, but not limited to MICROSOFT WORD. The application programs 401a-n have extracted an application description 402a-n, which is loaded in the PC Transplant Application Information File (AIF) 402. Each AIF 401 provides the required information to the PC Transplant Wizard process 403. The present preferred PC Transplant Wizard process 403 comprises the steps of presenting 404 application descriptions to the user, then selecting 405 applications and finally gathering 406 the application data. The result of the PC Transplant Wizard 403 is provided to the PC Transplant Personality Package 407 which performs the function of transplanting 408 application data to the PC.

Figure 5A:
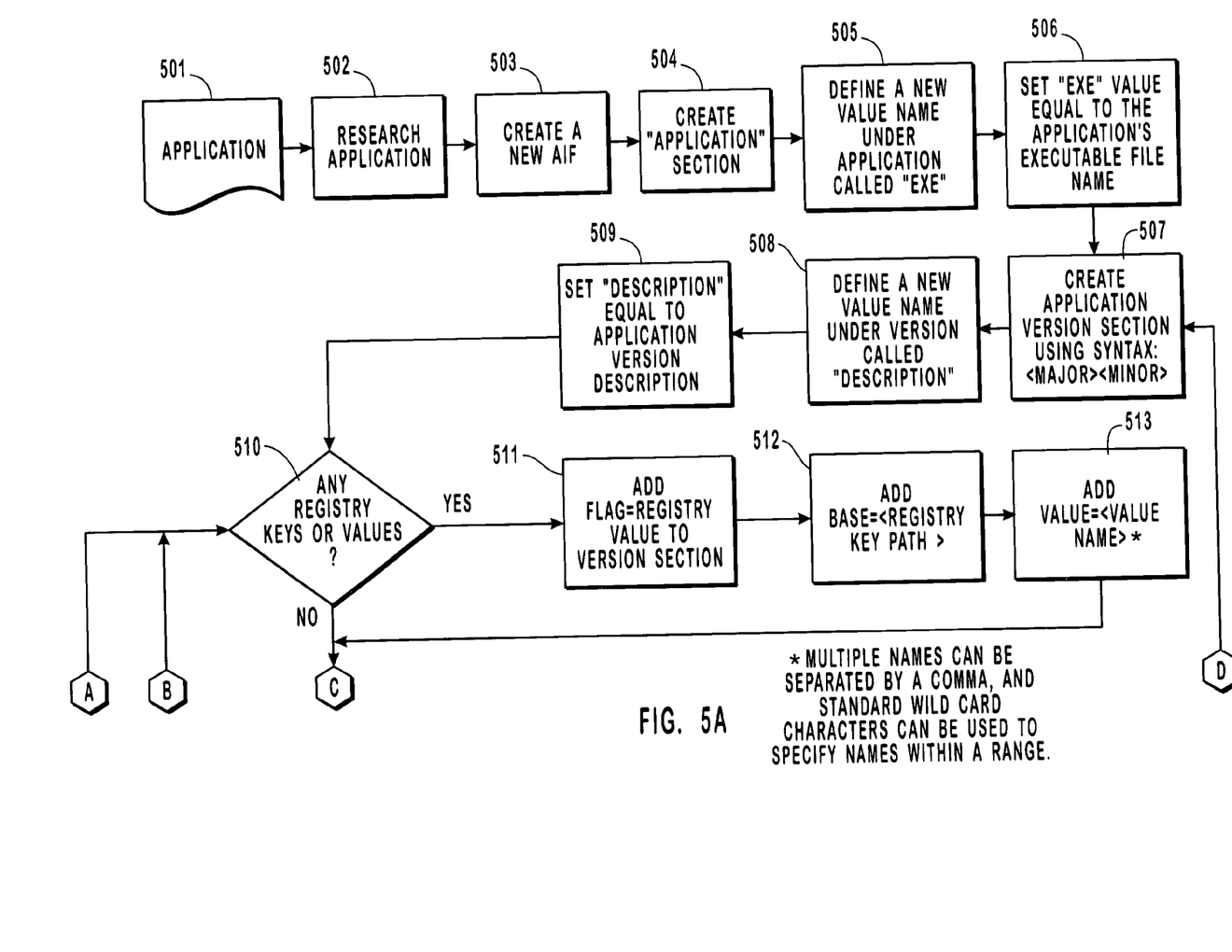
FIG. 5*a* is a process flow chart of the first section of the method steps of creating an Application Information File of the preferred embodiment of this invention.
Figure 5B:
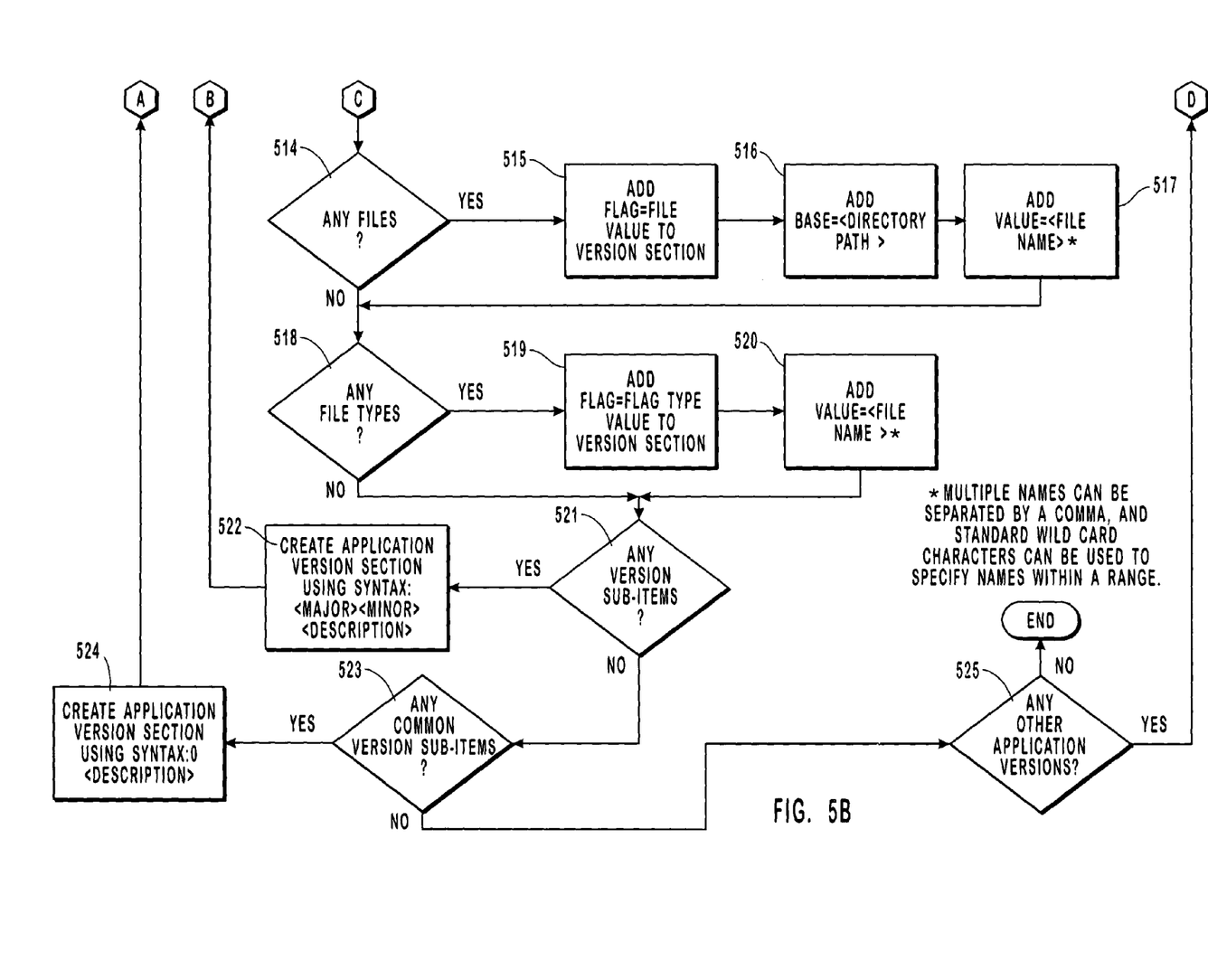
FIG. 5*b* is a process flow chart of the second section of the method steps of creating an Application Information File of the preferred embodiment of this invention.

FIG. 5a is a process flow chart of the first section of the method steps of creating an Application Information File of the preferred embodiment of this invention. The process shown in FIGS. 5a and 5b are the process of creating an Application Information File (AIF) in the present preferred embodiment of the invention. The Application of interest is provided 501. The provided Application is researched 502 to determine the description of the Application. A new AIF file is created 503. An Application section is created 504. A new value name under the Application called EXE is defined 505. The defined EXE value is set 506 equal to the Application's executable file name. Next, an Application version section is created 507 using, in the present preferred embodiment, the syntax: <Major><Minor>. A new value name under version called Description is defined 508. The Description is set 509 equal to the Application version description. A test 510 is then made to determine if any registry keys or values are present. If there are no registry keys or values, then process moves to step 514, shown on FIG. 5b. If there are registry keys or values, then the flag=registry value is added 511 to the version section. Next, the Base=<Registry Key Path> is added 512. And, finally the Value=<Value Name> is added 513.

FIG. 5b is a process flow chart of the second section of the method steps of creating an Application Information File of the preferred embodiment of this invention. If the test 510 of whether any registry or key values are present is no, then a test 514 is made to determine if there are any files. If there are files, then Flag=File Vale is added 515 to the version section. The Base=<Directory Path> is added 516 and the Value=<File Name> is added 517. If there are not files, then a test 518 is made to determine if there are any file types. If there are file types, the Flag=Flag Type Value is added 519 to the version section and the Value=<File Name> is added 520. If there are no file types, at test 521 is made to determine if there are any version sub-items. If there are any version sub-times, then an Application Version Section is created 522 using the syntax: <Major><Minor><Description>, after which the process returns to step 510, described above. If there are no version sub-items, then a test 523 is made to determine if there are any common version sub-items. If there are any common version sub-items, an Application Version Section using syntax: 0<Description> is created 524. Following the creation 524 of this Application Version Section the process returns to step 510 as described above. If there are no common version sub-items then a test 525 is made to determine if there are any other application versions, if there are other application versions, then the process returns to step 507, described above. If there are no other Application versions then this section of the process ends.

Figure 6:
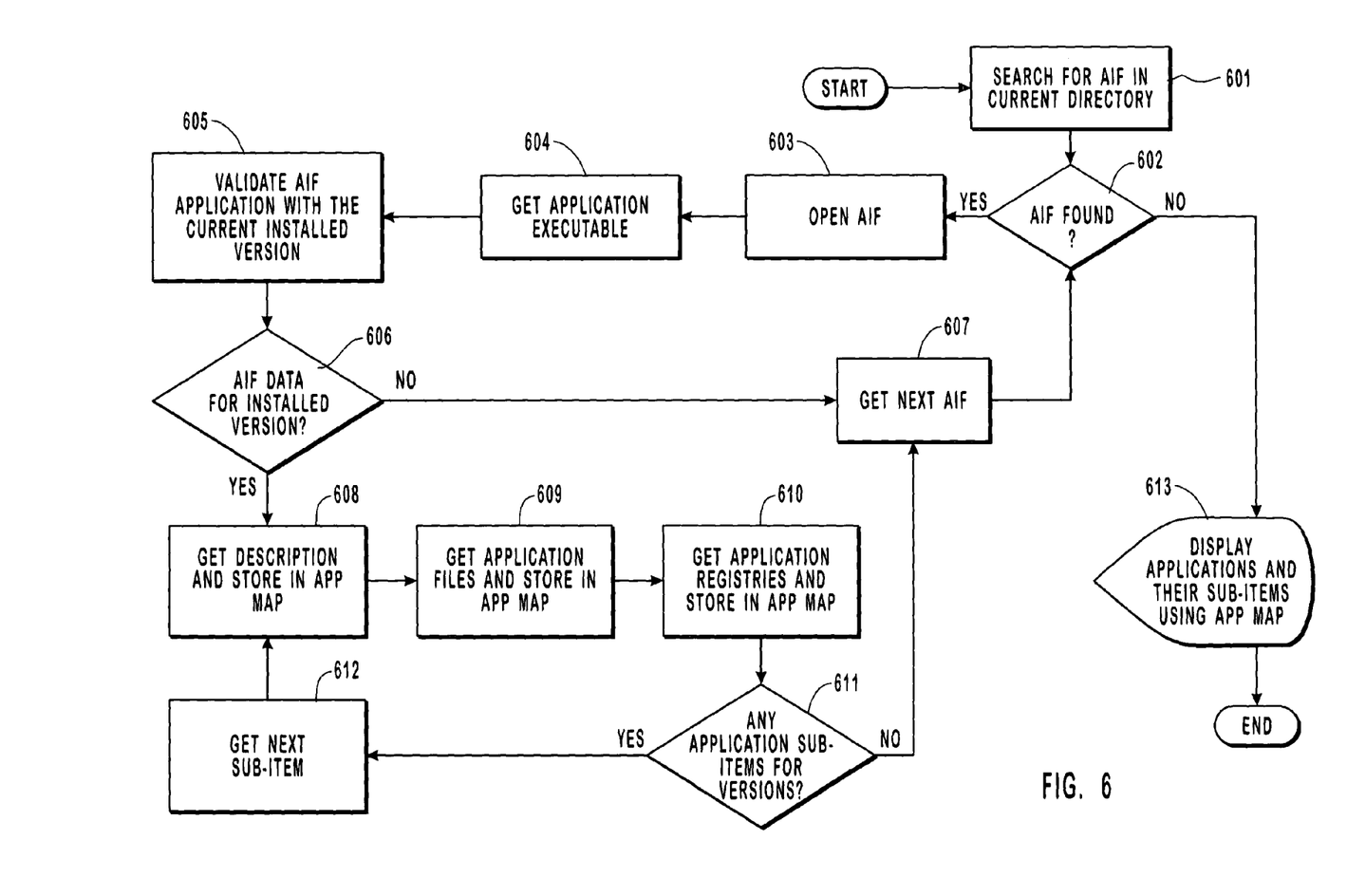
FIG. 6 is a process flow chart of the method steps of the process of showing the gathering of installed applications using Application Information Files, in this invention.

FIG. 6 is a process flow chart of the method steps of the process of showing the gathering of installed applications using Application Information Files, in this invention. After starting this process begins with a search 601 for an AIF in the current directory. A test 602 is made to determine if an AIF is found. If no AIF is found, the Applications and their sub-items are displayed 613 using App map, and the process ends. If an AIF is found, in the test 602, an AIF is opened 603, the Application Executable is gotten 604. The AIF Application is validated 605 with the current installed version. Then a test 606 is made to determine if AIF data is available for the installed version. If no AIF data is available then the next AIF is gotten 607 and the process returns to the test 602 for determining if an AIF is found. If AIF data for the installed version is available then the description is gotten 608 and stored in the App map. Application files are gotten 609 and stored in App map and then Application registries are gotten 610 and stored in App map. Next, a test 611 is made to determine if there are any Application sub-times for versions. If there are no Application sub-items for versions, the next AIF is gotten 607. If there are Application sub-items for versions, then the next sub-item is gotten 612 and the process returns to step 608, as described above.

Figure 7A:
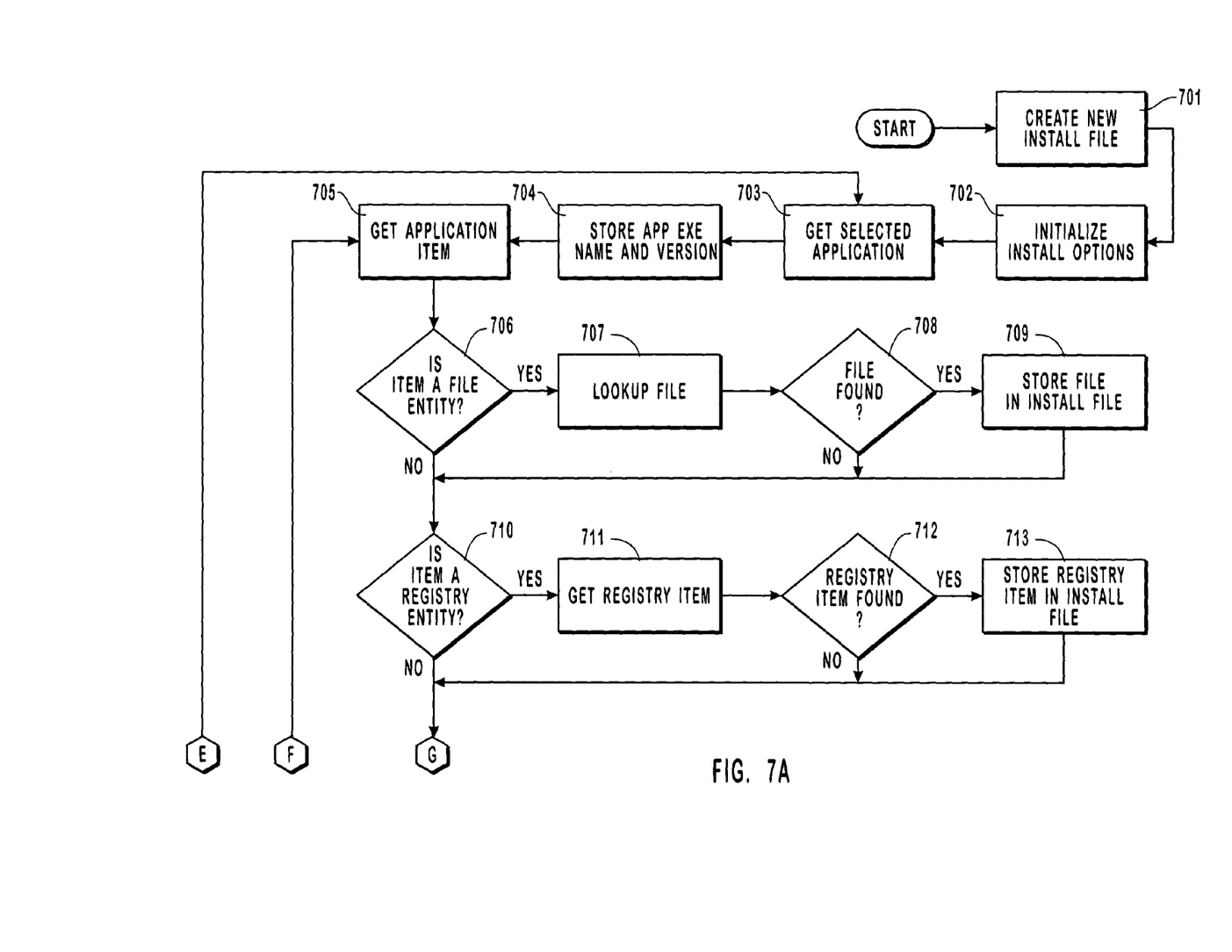
FIG. 7*a* is a process flow chart of the first section of the method steps of the Application data, gathered from an Application Information File, moving to an Install build file, of this invention.

FIG. 7a is a process flow chart of the first section of the method steps of the Application data, gathered from an Application Information File, moving to an Install build file, of this invention. This process starts and a new install file is created 701. Next, install options are initialized 702. The selected Application is gotten 703. The App EXE name and version are stored 704. An Application item is gotten 705. Next, a test 706 is made to determine if an item is a file entity. If the item is not a file entity, then a test 710 is made to determine if an item is a registry entity. If an item is a file entity, the file is looked up 707. Another test 708 is made to determine if a file is found. If no file is found, then the process proceeds to test 710. If a file is found, the file is stored 709 in the install file. If the item is not a registry entity, the process proceeds to step 714 of FIG. 7b. If the item is a registry entity, then the registry item is gotten 711, after which a test 712 is made to determine if a registry item is found. If no registry item is found, then the process proceeds to step 714 of FIG. 7b. If a registry item is found, it is stored 713 in an install file and the process proceeds to step 714 of FIG. 7b.

Figure 7B:
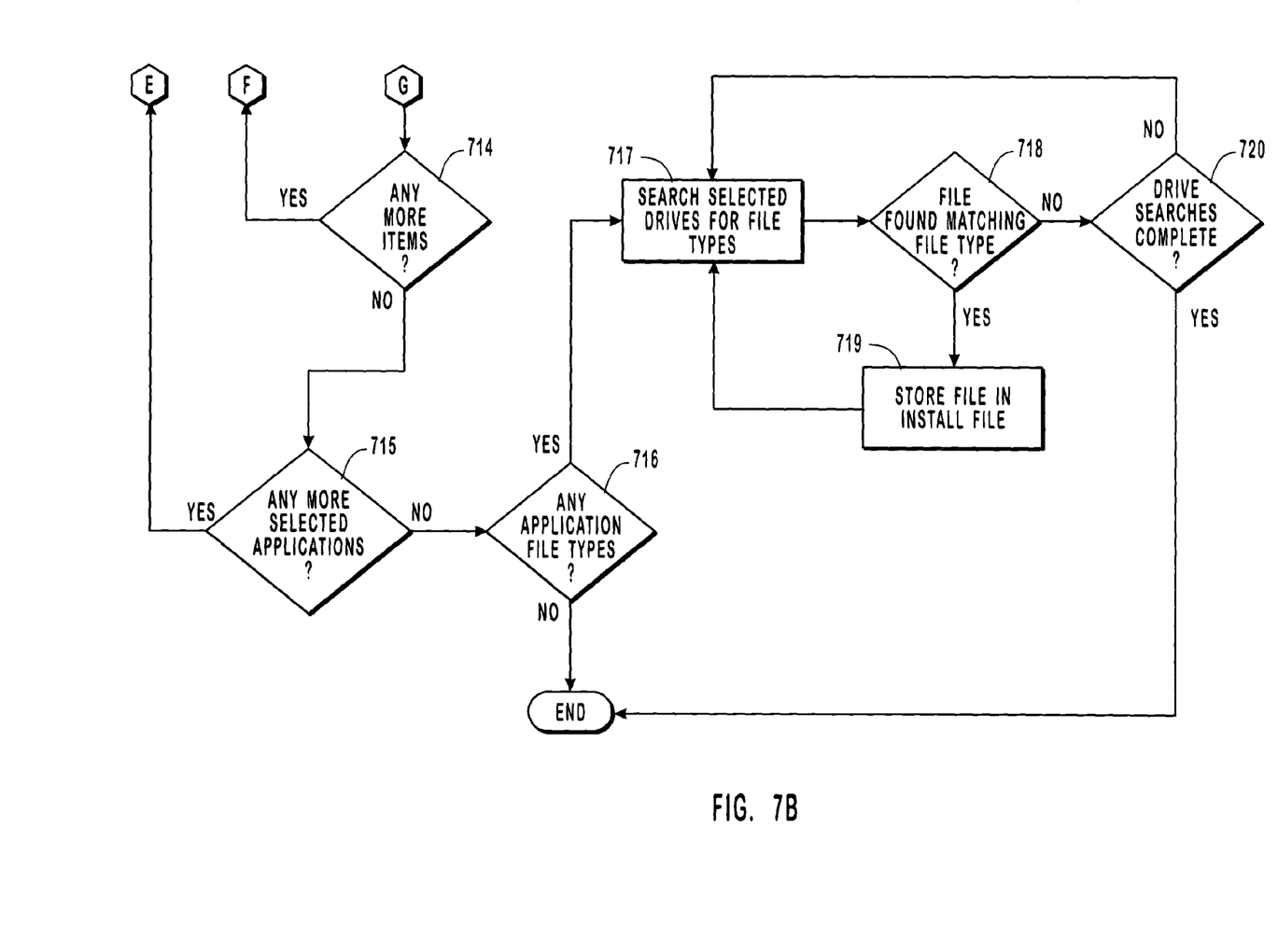
FIG. 7*b* is a process flow chart of the second section of the method steps of the Application data, gathered from an Application Information File, moving to an Install build file, of this invention.

FIG. 7b is a process flow chart of the second section of the method steps of the Application data, gathered from an Application Information File, moving to an Install build file, of this invention. Step 714 is a test to determine if there are any more items. If there are more items, then the process returns to step 705 described above with respect to FIG. 7a. If there are no further items, then a test 715 is made to determine if there are any more selected Applications. If there are more selected Applications, then the process returns to step 703 described above in the description of FIG. 7a. If there are no more selected Applications, a test 716 is made to determine if there are any Application file types. If there are no Application file types this part of the process ends. If there are Application file types then a search 717 is made for selected drives for file types. After which, a test 718 is made to determine if a file is found matching the file type. If such a file is found then, the file is stored 719 in the install file and the process returns to step 717, described above. If no such file is found, a test 720 is made to determine if the drive searches are complete. If the searches are complete then this part of the process of this invention ends. If the drive searches are not complete, the process returns to step 717 described above.

It is to be understood that the above described and referenced embodiments and examples are merely illustrative of numerous and varied other embodiments and applications which may constitute applications of the principles of the invention. These example embodiments are not intended to be exhaustive or to limit the invention to the precise form, connection or choice of components, computer language or modules disclosed herein as the present preferred embodiments. Obvious modifications or variations are possible and foreseeable in light of the above teachings. These embodiments of the invention were chosen and described to provide the best illustration of the principles of the invention and its practical application to thereby enable one of ordinary skill in the art to make and use the invention, without undue experimentation. Other embodiments may be readily devised by those skilled in the art without departing from the spirit or scope of this invention and it is our intent that they be deemed to be within the scope of this invention, as determined by the appended claims when they are interpreted in accordance with the breadth to which they are fairly, legally and equitably entitled.

We claim:

1. A system for describing and extracting application information, comprising:
   (A) A first computer system, said first computer system further comprising:
      (1) an input device;
      (2) a display device; and
      (3) A processing unit, said processing unit further comprising:
         (a) a processor
         (b) memory; and
         (c) A long-term storage device;
   (B) A second computer system, said second computer system further comprising:
      (1) an input device;
      (2) a display device; and
      (3) a processing unit, said processing unit further comprising:
         (a) a processor;
         (b) memory; and
         (c) a long-term storage device;
   (C) a first version of an application program resident on said long term storage device of said processing unit of said first computer system;
   (D) a second version of said application program resident on said long term storage device of said processing unit of said second computer system; and
   (E) means for migrating files and settings associated with said application program from said first computer to said second computer, wherein said means for migrating further comprises:
      (1) an application interface file identifying how to convert said files and settings from said first version to said second version of said application program;
      (2) a communication channel between said first computer system and said second computer system;
      (3) a console in communication with and configured according to said application interface file, said console configured to scan said first computer for said files and settings to be migrated to said second computer; and
      (4) a self-extracting auto-migration package built by said console, said self-extracting auto-migration package further comprising said files and settings for migration to said second computer, said self-extracting auto-migration package configured to update said second version of said application program with said files and settings of said first version.

2. The system for describing and extracting application information, as recited in claim 1, wherein said console modules further comprises:
   an executable program that scans for environment settings and files to be migrated and builds said self-extracting auto-migration packages.

3. The system for describing and extracting application information, as recited in claim 1, wherein said console further comprises:
   an edit function.

4. The system for describing and extracting application information, as recited in claim 1, wherein said console further comprises:
   a filter for determining which settings and file types are to be included in a said self-extracting auto-migration package.

5. The system for describing and extracting application information, as recited in claim 1, wherein said self-extracting auto-migration package is a self-executing file.

6. The system for describing and extracting application information, as recited in claim 1, wherein said self-extracting auto-migration package is editable by a user.

7. The system for describing and extracting application information, as recited in claim 1, wherein self-extracting auto-migration package is password protected.

8. The system for describing and extracting application information, as recited in claim 1, wherein said self-extracting auto-migration package includes data compression.

9. The system for describing and extracting application information, as recited in claim 1, wherein said self-extracting auto-migration package includes an operating system conversion capability.

10. The system for describing and extracting application information, as recited in claim 1, wherein said self-extracting auto-migration package includes disk space verification.

11. The system for describing and extracting application information, as recited in claim 1, wherein said self-extracting auto-migration package further comprises a text description capability.

12. The system for describing and extracting application information, as recited in claim 1, wherein said self-extracting auto-migration package further comprises options for handling duplicate files.

13. The system for describing and extracting application information, as recited in claim 1, wherein said self-extracting auto-migration package includes the capability of performing unattended installation of files.

14. The system for describing and extracting application information, as recited in claim 1, wherein said self-extracting auto-migration package further comprises user-defined profiles.

15. A method for extracting and migrating application information, comprising:
   (A) loading Personality Package corresponding to a user, said Personality Package comprising user settings, user preferences, application programs and data files for migration from a source computer to a destination computer, said Personality Package corresponding to specified application versions;
   (B) executing said Personality Package;
   (C) getting a file;
   (D) copying said file, and determining whether migration of additional files is required and if additional files are required returning to said getting a file step;
   (E) getting a registry;
   (F) copying said registry;
   (G) getting application version specifics, and testing to determine if destination application versions in said destination computer match said application versions specified in said Personality Package, and generating an error if said destination application version do not match; and
   (H) updating links.

16. The method of claim 15, further comprising:
determining whether said file is a shell link; and
if said file is a shell link, adding said file to a shell link list.

17. The method of claim 16, further comprising updating shell links in said destination computer using said shell link list.

* * * * *